(12) United States Patent
Aoyama et al.

(10) Patent No.: US 8,709,589 B2
(45) Date of Patent: Apr. 29, 2014

(54) WHITE POLYESTER FILM AND SURFACE LIGHT SOURCE THEREWITH

(75) Inventors: Shigeru Aoyama, Otsu (JP); Akikazu Kikuchi, Otsu (JP); Kozo Takahashi, Otsu (JP)

(73) Assignee: Toray Industries, Inc. (JP)

( * ) Notice: Subject to any disclaimer, the term of this patent is extended or adjusted under 35 U.S.C. 154(b) by 148 days.

(21) Appl. No.: 12/602,866

(22) PCT Filed: May 29, 2008

(86) PCT No.: PCT/JP2008/059864
§ 371 (c)(1),
(2), (4) Date: Dec. 9, 2009

(87) PCT Pub. No.: WO2008/149757
PCT Pub. Date: Dec. 11, 2008

(65) Prior Publication Data
US 2010/0143699 A1 Jun. 10, 2010

(30) Foreign Application Priority Data
Jun. 7, 2007 (JP) ................................ 2007-151289

(51) Int. Cl.
B32B 5/18 (2006.01)
B32B 5/16 (2006.01)

(52) U.S. Cl.
USPC ............... 428/317.9; 428/480; 428/318.6; 428/319.3; 428/319.7; 428/402

(58) Field of Classification Search
USPC ............. 428/317.9, 319.3, 319.7, 480, 318.6, 428/402
See application file for complete search history.

(56) References Cited

U.S. PATENT DOCUMENTS

| | | | |
|---|---|---|---|
| 5,912,060 A * | 6/1999 | Kishida et al. ............... 428/35.2 |
| 6,326,431 B1 | 12/2001 | Peiffer et al. |
| 6,627,695 B2 | 9/2003 | Murschall et al. |
| 6,635,340 B2 | 10/2003 | Murschall et al. |
| 6,641,924 B1 | 11/2003 | Peiffer et al. |
| 6,884,517 B2 | 4/2005 | Peiffer et al. |
| 6,916,548 B2 * | 7/2005 | Murschall et al. ............ 428/480 |
| 6,936,350 B2 | 8/2005 | Murschall et al. |
| 2001/0029274 A1 | 10/2001 | Murschall et al. |
| 2001/0031802 A1 | 10/2001 | Murschall et al. |
| 2002/0115760 A1 | 8/2002 | Murschall et al. |
| 2002/0160215 A1 | 10/2002 | Peiffer et al. |
| 2005/0266215 A1 * | 12/2005 | Laney ........................... 428/212 |
| 2006/0275601 A1 * | 12/2006 | Suzuki et al. ................. 428/339 |
| 2009/0042016 A1 * | 2/2009 | Yoshida et al. ............ 428/317.9 |
| 2010/0086736 A1 * | 4/2010 | Ueda et al. .................... 428/141 |

FOREIGN PATENT DOCUMENTS

| | | |
|---|---|---|
| JP | 61-271308 A | 12/1986 |
| JP | 5-140349 A | 6/1993 |
| JP | 6-322153 A | 11/1994 |
| JP | 7-118433 A | 5/1995 |
| JP | 8-143692 A | 6/1996 |
| JP | 8-302048 A | 11/1996 |
| JP | 2001-064492 A | 3/2001 |
| JP | 2001-233983 A | 8/2001 |
| JP | 2001-240686 A | 9/2001 |
| JP | 2001-279003 A | 10/2001 |
| JP | 2001-288284 A | 10/2001 |
| JP | 2001-288350 A | 10/2001 |
| JP | 2001-294735 A | 10/2001 |
| JP | 2007-178505 A | 7/2007 |

* cited by examiner

Primary Examiner — Hai Vo
(74) Attorney, Agent, or Firm — DLA Piper LLP (US)

(57) ABSTRACT

A white polyester film has a high level of whiteness, reflectivity, lightness, or thermal dimensional stability, and a surface light source that is produced with the white polyester film and has a high level of brightness characteristics. The white polyester film includes a white polyester layer (W layer) containing a polyester resin component (A) and a component (B) incompatible with the resin component (A) and having voids inside, wherein the incompatible component (B) is a cyclic-olefin resin (b) having a glass transition temperature of 110° C. or more, and the content Z of the cyclic-olefin resin (b) in the white polyester layer (W layer) is from 5% by weight to 50% by weight, based on the amount of the white polyester layer (W layer). The surface light source is produced therewith.

11 Claims, No Drawings

WHITE POLYESTER FILM AND SURFACE LIGHT SOURCE THEREWITH

RELATED APPLICATIONS

This is a §371 of International Application No. PCT/JP2008/059864, with an international filing date of May 29, 2008 (WO 2008/149757 A1, published Dec. 11, 2008), which is based on Japanese Patent Application No. 2007-151289, filed Jun. 7, 2007, the subject matter of which is incorporated by reference.

TECHNICAL HELD

This disclosure relates to an improvement in white polyester films and more specifically to a white polyester film suitable as a reflecting plate for surface light sources and as a reflector and useful to form brighter surface light sources having high lighting efficiency.

BACKGROUND

In recent years, various liquid crystal-based displays have been used in personal computers, televisions, cellular phones, and so on. Since such liquid crystal displays themselves are not light-emitting devices, surface light sources, called backlights, are placed on the back side for illumination to enable the display. To meet the requirement that not only illumination itself but also uniform illumination over the screen should be provided, backlights have a surface light source structure called side light type or direct type. In particular, side light type backlights, which illuminate the screen from the side, are used in slim liquid crystal display applications for slimness or small size requiring notebook computers and so on.

In general, such side light type backlights use a light guide plate system that uniformly illuminates the whole of a liquid crystal display through a light guide plate for uniformly transmitting and diffusing light from a cold cathode fluorescent lamp as an illuminating light source placed on the edge of the light guide plate. In this illumination system, a reflector is provided around the cold cathode fluorescent lamp to use light more efficiently, and a reflecting plate is provided under the light guide plate to efficiently reflect, to the liquid crystal screen side, the light diffused by the light guide plate. This structure reduces the loss of light from the cold cathode fluorescent lamp and provides the function of brightening the liquid crystal screen.

On the other hand, large-screen applications such as liquid crystal televisions use a direct light system, because the edge light system does not promise the desired high screen brightness. In the direct light system, cold cathode fluorescent lamps are arranged in parallel under the liquid crystal screen and placed parallel to one another above a reflecting plate. A flat reflecting plate or a reflecting plate shaped like a semicircular arch along a part of the cold cathode fluorescent lamp is used.

Such a reflector or reflecting plate for use in surface light sources for liquid crystal screen (generically called "surface light source reflecting member") is required to be a thin film and to have high reflection performance. Conventionally, a white pigment-containing film, a film containing fine voids inside, or a laminate of such a film and a metal plate, a plastic plate or the like has been used. In particular, the film containing fine voids inside is widely used, because it is highly effective in increasing brightness and has high uniformity.

(Japanese Patent Application Laid-Open (JP-A) No. 6-322153 and JP-A No. 07-118433)

Concerning the film containing fine voids inside, a nucleating agent is added to form the fine voids. An acyclic olefin resin such as polypropylene or polymethylpentene has been used as the nucleating agent. Liquid crystal screen applications have been extended from conventional notebook computers to other various devices such as desktop personal computers, televisions, and cellular phone displays in recent years. As high definition images on the liquid crystal screen have been required, improvements have been made to enhance the liquid crystal screen brightness and to make the image clearer and highly visible and, therefore, high-brightness and high-power illuminating light sources (such as cold cathode fluorescent lamps) have been used.

However, when the above conventional film is used as a surface light source reflecting member such as a reflecting plate or a reflector, light from the illuminating light source is partially transmitted to the opposite side, because of its low light reflectivity, so that the brightness (luminosity) of the liquid crystal screen may be insufficient and that the lighting efficiency may be reduced by the loss of the light transmitted from the illuminating light source. Such a problem has been pointed out, and there has been a strong demand for an improvement in the reflectivity and opacity of the white film.

For this purpose, it is necessary to make a fine dispersion of the nucleating agent. However, there have been the problems that (1) in recent years, making a fine dispersion of the nucleating agent is reaching a limit; and that (2) if fine dispersion is achieved, voids cannot be stably formed or maintained in a film production process, because the nucleating agent has low stiffness or low deformation temperature.

In addition, if the film production conditions are changed (for example, the heat treatment temperature is lowered) to solve the problem (2), a new problem such as low dimensional stability may occur.

SUMMARY

We thus provide a white polyester film, including a white polyester layer (W layer) containing a polyester resin component (A) and a component (B) incompatible with the resin component (A) and having voids inside, wherein the incompatible component (B) is a cyclic-olefin resin (b) having a glass transition temperature of 110° C. or more, and the content Z of the cyclic-olefin resin (b) in the white polyester layer (W layer) is from 5% by weight to 50% by weight, based on the amount of the white polyester layer (W layer).

The white polyester film has a high level of reflection properties, thermal dimensional stability, lightness, or the like, and is useful as a reflecting plate or a reflector in a surface light source to make it possible to brightly illuminate a liquid crystal screen and to make a liquid crystal display image clearer and highly visible.

DETAILED DESCRIPTION

The white polyester film includes a white polyester layer (W layer) containing a polyester resin component (A) and a component (B) incompatible with the resin component (A) and having voids inside, wherein the incompatible component (B) is a cyclic-olefin resin (b) having a glass transition temperature of 110° C. or more, and the content Z of the cyclic-olefin resin (b) in the white polyester layer (W layer) is from 5% by weight to 50% by weight, based on the amount of the white polyester layer (W layer).

This feature dramatically improves the whiteness, light reflectivity, opacity, or the like of the white polyester film.

The white polyester layer (W layer) has voids inside, while the voids may be of any shape. The voids may be closed voids or two-dimensionally or three-dimensionally connected voids.

While the voids may be of any shape, a large number of gas-solid interfaces are preferably formed in the film thickness direction.

Therefore, the voids preferably have circular cross-sectional shapes or elliptical cross-sectional shapes elongated in the film in-plane direction. This is because the whiteness or light reflectivity of the film is produced by the reflection of rays incident on the film from the internal gas-solid interfaces (interfaces between the voids and the polyester resin as a matrix resin).

To form such voids, the white polyester film is preferably produced by a process including melt extruding a mixture containing the polyester resin component (A) for serving as a matrix resin to form the white polyester layer (W layer) and the component (B) incompatible with the resin component (A) and then stretching the mixture in at least one direction to form voids inside so that interfaces can be formed.

This technique produces flat voids based on the fact that flaking occurs at the interface between the resin component (A) and the incompatible component (B) as main components of the light-reflecting film during the stretching. When this technique is used, therefore, biaxial stretching is more preferred than uniaxial stretching in increasing the volume of the voids in the film and increasing the number of the interfaces per unit thickness.

The polyester resin component (A) may be composed of a single polyester resin or a plurality of polyester resins (namely, a mixture of a plurality of polyester resins). The same may apply to the incompatible component (B).

The content Z of the cyclic-olefin resin (b) having a glass transition temperature of 110° C. or more and serving as the incompatible component (B) is from 5% by weight to 50% by weight, based on the amount of the white polyester layer (W layer).

The cyclic-olefin resin (b) is a resin containing, as a monomer unit, at least one cyclic olefin selected from the group consisting of cycloalkene, bicycloalkene, tricycloalkene, and tetracycloalkene. The cyclic-olefin resin (b) may be a resin composed of the cyclic olefin or a copolymer of the cyclic olefin and a straight-chain olefin such as ethylene or propylene. Typical examples of the cyclic olefin include bicyclo[2,2,1]hept-2-en, 6-methylbicyclo[2,2,1]hept-2-en, 5,6-dimethylbicyclo[2,2,1]hept-2-en, 1-methylbicyclo[2,2,1]hept-2-en, 6-ethylbicyclo[2,2,1]hept-2-en, 6-n-butylbicyclo[2,2,1]hept-2-en, 6-isobutylbicyclo[2,2,1]hept-2-en, 7-methylbicyclo[2,2,1]hept-2-en, tricyclo[4,3,0,1$^{2.5}$]-3-decene, 2-methyl-tricyclo[4,3,0,1$^{2.5}$]-3-decene, 5-methyl-tricyclo[4,3,0,1$^{2.5}$]-3-decene, tricyclo[4,4,0,1$^{2.5}$]-3-decene, and 10-methyl-tricyclo[4,4,0,1$^{2.5}$]-3-decene.

In particular, bicyclo[2,2,1]hept-2-en (norbornene) or derivatives thereof are preferred in view of productivity, transparency, or making Tg higher as described later.

The cyclic-olefin resin (b) has a glass transition temperature of 110° C. or more.

When the cyclic-olefin resin (b) is used as the incompatible component (B), a large number of fine flat voids more than those produced with conventional incompatible components such as polymethylpentene, polypropylene, and polystyrene can be formed in the film. This makes it possible to dramatically improve the whiteness, light reflectivity, opacity, or the like of the film. This also makes it possible to further increase the brightness, when the film is used in a backlight unit.

The cyclic-olefin resin (b) used as the incompatible component (B) may be finely dispersed by kneading it into the matrix resin (A), while both are melted. How finely the resin should be dispersed significantly depends on the interfacial tension difference between the matrix resin (A) and the incompatible component (B) and shearing during the kneading, while it may depend on various factors.

The cyclic-olefin resin (b) having a glass transition temperature of 110° C. or more can more finely dispersed than conventional polyolefins (such as polypropylene and polymethylpentene). It may be because during the melt kneading process, the cyclic-olefin resin (b) has an interfacial tension closer to that of the polyester resin component (A) than that of conventional polyolefins.

It is also considered that when the cyclic-olefin resin (b) has a glass transition temperature of 110° C. or more, shearing can be easily applied during the kneading, so that the finely dispersing effect can also be produced.

Flat voids are formed by flaking during a stretching process, in which the lower the stiffness of the incompatible component (B), the less likely the flaking at the interface between the matrix resin component (A) and the incompatible component (B) (the incompatible component (B) will be deformed together with the matrix resin component (A)).

Therefore, it is considered that as the glass transition temperature of the cyclic-olefin resin (b) increases, the interfacial flaking may proceed so that a large number of fine flat voids can be stably formed.

In particular, the cyclic-olefin resin (b) having a glass transition temperature of 110° C. or more dramatically improves the void forming ability.

It is also considered that the use of the cyclic-olefin resin (b) having a glass transition temperature of 110° C. or more will be effective in suppressing the loss of voids in the process of heat-treating the film. In general, the film is heat-treated at around 200° C. so as to have thermal dimensional stability, after it is stretched. However, if the thermal deformation temperature of the incompatible component (B) is low, the incompatible resin may be deformed in the heat-treating process, so that some voids may be lost (or allowed to contract).

The thermal deformation temperature generally depends on the glass transition temperature. Therefore, the use of the cyclic-olefin resin (b) having a relatively high glass transition temperature makes it possible to significantly suppress the loss of voids, even when heat treatment is performed.

For the reason described above, the use of the cyclic-olefin resin (b) having a glass transition temperature of 110° C. or more makes it possible to form a large number of fine flat voids in the process of forming the film, so that the whiteness, light reflectivity, lightness, thermal dimensional stability, or the like of the film can be dramatically improved and that higher brightness can be obtained when the film is used in a backlight unit.

Specifically, the glass transition temperature is preferably 130° C. or more, more preferably 160° C. or more, even more preferably 180° C. or more. This range makes possible finer dispersion into the matrix resin in the kneading process, more stable formation of voids in the stretching process, and higher suppression of the loss of voids in the heat-treating process.

The upper limit of the glass transition temperature is preferably equal to or lower than the melting point of the polyester resin component (A), while it is not particularly specified. The upper limit of the glass transition temperature is more preferably the melting point-20° C. (20° C. lower than the melting point), even more preferably the melting point-40° C.

(40° C. lower than the melting point). More specifically, when the polyester resin component (A) is polyethylene terephthalate or the like, the glass transition temperature is preferably 250° C. or less, more preferably 230° C. or less, particularly preferably 210° C. or less. It is because if the glass transition temperature is higher than 250° C., the cyclic-olefin resin (b) may be insufficiently melted in the melt kneading process with the matrix resin (A), so that fine dispersion may not be promoted.

On the other hand, if the glass transition temperature is less than 110° C., the incompatible component (B) may not be finely dispersed, so that the desired whiteness, reflectivity, or lightness cannot be obtained, or uneven stretching may occur.

The glass transition temperature (Tg) may be the midpoint glass transition temperature (Tmg) according to JIS K 7121 (1987), which may be determined by a process that includes heating the resin from 25° C. to 300° C. at a heating rate of 20° C./minute under a nitrogen atmosphere using a differential scanning calorimeter (e.g., RDC220 Robot DSC (Seiko Instruments Inc.)), holding the heated state for 10 minutes, then quenching the resin to 25° C. or lower, and raising the temperature again from room temperature to 300° C. at a heating rate of 20° C./minute to obtain endothermic and exothermic curves (DSC curve).

The cyclic-olefin resin (b) may be produced by known liquid-phase polymerization methods (see for example JP-A No. 61-271308), or a commercially available product (such as TOPAS (Polyplastics Co., Ltd.)) may be used as the cyclic-olefin resin (b).

Examples of methods for setting the glass transition temperature to 110° C. or more include increasing the content of the cyclic-olefin component in the cyclic-olefin resin (b) and reducing the content of the straight-chain olefin component such as ethylene in the cyclic-olefin resin (b).

Specifically, the content of the cyclic-olefin component is preferably 60% by mole or more, more preferably 70% by mole or more, even more preferably 80% by mole or more, while the content of the straight-chain olefin component such as ethylene is preferably less than 40% by mole, more preferably less than 30% by mole, even more preferably less than 20% by mole.

In these ranges, the cyclic-olefin resin (b) can have a high glass transition temperature.

While the content of each component is not limited within the above range, it is preferable that the content of the cyclic-olefin component is not 95% by mole or more, or that the content of the straight-chain olefin component such as ethylene is not less than 5% by mole. It is because within such a range, the polymerization may require a very long time, which is disadvantageous in productivity or cost.

The straight-chain olefin component is preferably, but not limited to, an ethylene component in view of reactivity.

The cyclic-olefin component is preferably, but not limited to, bicyclo[2,2,1]hept-2-en (norbornene) or a derivative thereof in view of productivity, transparency or making Tg high.

Besides the above two components, if necessary, any other copolymerizable unsaturated monomer component may be copolymerized, as long as it does not interfere with the objects of this disclosure. Examples of such a copolymerizable unsaturated monomer include α-olefins of 3 to 20 carbon atoms, such as propylene, 1-butene, 4-methyl-1-pentene, 1-hexene, 1-octene, 1-decene, 1-dodecene, 1-tetradecene, 1-hexadecene, 1-octadecene, and 1-eicosen, cyclopentene, cyclohexene, 3-methylcyclohexene, cyclooctene, 1,4-hexadiene, 4-methyl-1,4-hexadiene, 5-methyl-1,4-hexadiene, 1,7-octadiene, dicyclopentadiene, 5-ethylidene-2-norbornene, 5-vinyl-2-norbornene, tetracyclododecene, 2-methyltetracyclododecene, and 2-ethyltetracyclododecene.

The content Z of the cyclic-olefin resin (b) having a glass transition temperature of 110° C. or more is from 5% by weight to 50% by weight, based on the amount of the white polyester layer (W layer).

When the content Z is in this range, whiteness, reflectivity and lightness can be sufficiently produced.

If the content Z of the cyclic-olefin resin (b) is less than 5% by weight, a low level of whiteness or light reflectivity may be provided. If it is more than 50% by weight, the film may have reduced strength and tend to be broken during stretching.

In view of whiteness or light reflectivity, the content Z of the cyclic-olefin resin (b) is preferably 10% by weight or more, more preferably 20% by weight or more, even more preferably 30% by weight or more.

The cyclic-olefin resin (b) is preferably amorphous.

As used herein, the term "amorphous" means that the heat of fusion of crystal is less than 1 cal/g as measured with a differential scanning calorimeter at a heating rate of 20° C./minute.

The use of the amorphous cyclic-olefin resin (b2) makes it possible to further facilitate the fine dispersion in the matrix resin (A) and to significantly improve the whiteness or light reflectivity of the film.

Although the detailed reason for the production of such an effect is not clear, it is considered that when it is amorphous, the temperature dependence of the melt viscosity is reduced so that shearing can be efficiently applied during kneading.

For example, the cyclic olefin resin (b) may be made amorphous by increasing the content of the cyclic-olefin component in the cyclic-olefin resin (b). It is because the introduction of the cyclic-olefin component can increase the steric hindrance and reduce the crystallinity.

The preferred content of the cyclic-olefin component depends on the type of the introduced cyclic-olefin component. For example, when ethylene and norbornene are selected as the structural components, the content of the norbornene component is preferably 60% by weight or more (the ethylene component is preferably 40% by weight or less), more preferably 70% by weight or more (the ethylene component is more preferably 30% by weight or less), even more preferably 80% by weight or more (the ethylene component is even more preferably 20% by weight or less), based on the weight of the final resin product after the completion of the polymerization.

The upper limit of the content of the cyclic-olefin component is preferably, but not limited to, 99% by weight or less. If it is more than 99% by weight, the resin will be close to a homopolymer so that its viscosity may be significantly high, which may make mass production impossible.

The polyester resin for use in the polyester resin component (A) includes a dicarboxylic acid and a diol as structural components and may be obtained by polycondensation thereof. Typical examples of the dicarboxylic acid component as a structural component include aromatic dicarboxylic acids such as terephthalic acid, isophthalic acid, 5-sodium sulfoisophthalic acid, phthalic acid, and diphenic acid, and ester derivatives thereof; aliphatic dicarboxylic acids such as adipic acid, sebacic acid, dodecadionic acid, eicosanoic acid, and dimer acid, and ester derivatives thereof; aliphatic cyclic dicarboxylic acids such as 1,4-cyclohexanedicarboxylic acid and ester derivatives thereof; and polyfunctional acids such as trimellitic acid and pyromellitic acid, and ester derivatives thereof. Typical examples of the diol component include ethylene glycol, propanediol, butanediol, neopentylglycol, pentanediol, hexanediol, octanediol, decanediol, cyclohexanedimethanol, diethylene glycol, triethylene glycol, polyethylene glycol, tetramethylene glycol, polyethylene glycol, and polyethers such as polytetramethylene glycol.

Examples of polyesters that are preferably used include polyethylene terephthalate (hereinafter also abbreviated as PET), polyethylene-2,6-naphthalene dicarboxylate, polypropylene terephthalate, polybutylene terephthalate, and poly-1,4-cyclohexylenedimethylene terephthalate.

Using a polyester resin as the matrix resin, high mechanical strength can be imparted to the film, while high colorlessness is maintained. In addition, it is also inexpensive. A copolyester resin having a basic structure of polyethylene terephthalate or the like and a copolymerized component introduced therein may also be used as the polyester resin component (A). The introduction of the copolymerizable component into the polyester resin may be performed by a method including adding the copolymerizable component in the process of polymerization of polyester pellets as a raw material and using the pellets in which the component has already been copolymerized, or by a method including supplying a mixture of, for example, pellets of a homopolymer such as polybutylene terephthalate and pellets of polyethylene terephthalate to an extruder and copolymerizing them by transesterification when they are melted.

A polyester resin free of copolymerized components may be used in combination with a copolyester resin having a copolymerized component to form the polyester resin component (A).

In the case of copolymerization, the content of the copolymerized component is preferably, but not limited to, 1 to 70% by mole, more preferably 10 to 40% by mole, based on the amount of each of the dicarboxylic acid component and the diol component, in view of transparency, formability or the like and in view of making the resin amorphous as described below.

Preferably, amorphous polyester (a2) produced by copolymerization is used. As used herein, the term "amorphous" refers to a resin having a heat of fusion of crystal of less than 1 cal/g as described in detail later. In contrast, a resin having a heat of fusion of crystal of 1 cal/g or more is referred to as a crystalline resin.

Preferred examples of the amorphous polyester resin (a2) include PET copolymer resins in which an aliphatic cyclic diol is copolymerized as a diol component, PET copolymer resins in which isophthalic acid is copolymerized as a dicarboxylic acid component, and PET copolymer resins in which an aliphatic cyclic dicarboxylic acid is copolymerized as a dicarboxylic acid component. In particular, an amorphous PET copolymer resin in which cyclohexanedimethanol (an aliphatic cyclic glycol) is copolymerized as a diol component, or a PET copolymer resin in which an aliphatic cyclic dicarboxylic acid is copolymerized as a dicarboxylic acid component is preferably used in view of transparency or formability or in view of the effect of finely dispersing the incompatible resin as described below. In view of easy availability of monomers, the amorphous PET resin in which cyclohexanedimethanol (an aliphatic cyclic glycol) is copolymerized as a diol component is more preferred.

When cyclohexanedimethanol is used to form an amorphous resin, the content of the copolymerized cyclohexanedimethanol component is preferably 25% by mole or more, more preferably 30% by mole or more, based on the amount of the diol components of the polyester resin, in view of forming an amorphous resin.

When cyclohexanedicarboxylic acid is used to form an amorphous resin, the content of the copolymerized cyclohexanedicarboxylic acid component is preferably 25% by mole or more, more preferably 30% by mole or more, based on the amount of the dicarboxylic acid components of the polyester resin, in view of forming an amorphous resin.

The amorphous polyester resin (a2) used as the structural component of the polyester resin component (A) is effective in making a more stable dispersion of the incompatible component in the matrix resin and in finely dispersing the incompatible component. Although the detailed reason for the production of such an effect is not clear, thii makes it possible to form a large number of voids in the film, so that high reflectivity, high whiteness, or lightness can be achieved. In addition, the stretchability of the film or the film forming ability can also be improved.

The white polyester film preferably includes both the crystalline polyester (a1) and the amorphous polyester resin (a2). In this case, the resulting white polyester film can have a high level of mechanical properties and reflection properties. Examples of the type of the crystalline polyester (a1) include, but are not limited to, PET, polyethylene-2,6-naphthalene dicarboxylate, polypropylene terephthalate, and polybutylene terephthalate. Particularly, in view of mechanical properties, PET is preferably used.

In the white polyester film, the content a2w of the amorphous polyester resin (a2) in the white polyester layer (W layer) is preferably 10% by weight or more, based on the amount of the white polyester layer (W layer). The content a1w of the crystalline polyester (a1) in the white polyester layer (W layer) is preferably less than 50% by weight, based on the amount of the white polyester layer (W layer).

When the content a1w or a2w is in the above range, the film forming ability and the mechanical properties can be maintained, while the above effect of dispersing the incompatible component (B) is sufficiently produced.

While the upper limit of the content a2w of the amorphous polyester resin (a2) or the lower limit of the content a1w of the crystalline polyester (a1) is not limited, the content a2w of the amorphous polyester resin (a2) is preferably 50% by weight or less, based on the amount of the white polyester layer (W layer), and the content a1w of the crystalline polyester (a1) is preferably 10% by weight or more, based on the amount of the white polyester layer (W layer). If the content is outside the above range, the film forming ability or the mechanical properties may be reduced.

In the white polyester film, the polyester resin component (A) preferably contains the crystalline polyester resin (a1) and the amorphous polyester resin (a2), and the ratio (a2w/Z) of the content a2w (% by weight) of the amorphous polyester resin (a2) in the white polyester layer (W layer) to the content Z (% by weight) of the cyclic-olefin resin (b) in the white polyester layer (W layer) is preferably from 0.01 to 0.85 or from 0.95 to 1.75. If the ratio is less than 0.01, the finely dispersing effect of the addition of the amorphous polyester resin may be insufficient, so that the reflection properties may tend to be significantly reduced, or the film forming ability may tend to be reduced. If the ratio is more than 0.85 and less than 0.95, the reflectivity may not be improved, and the heat resistance may tend to be reduced. If the ratio is more than 1.75, the heat resistance of the film may be significantly reduced, which is not preferred. When the ratio is in the range of 0.01 to 0.85, a reflective film with high heat resistance is provided. When the ratio is in the range of 0.95 to 1.75, a reflective film with a high level of reflection properties is provided. The ratio is more preferably from 0.4 to 0.85 or from 0.95 to 1.5.

In the white polyester film, the white polyester layer (W layer) preferably includes an aliphatic cyclic diol component or an aliphatic cyclic dicarboxylic acid component and an isophthalic acid component, and preferably satisfies a Formula 1 or 2:

$$0.01 < (X+Y)/Z < 0.33 \quad \text{(Formula 1)}$$

$$0.37 < (X+Y)/Z < 0.75 \quad \text{(Formula 2)}$$

wherein X is the content (% by mole) of the aliphatic cyclic diol component based on the total amount of all the diol components in the W layer, Y is the sum (% by mole) of the contents (% by mole) of the aliphatic cyclic dicarboxylic acid component and the isophthalic acid component based on the total amount of all the dicarboxylic acid components in the W layer, and Z is the content (% by weight) of the cyclic-olefin resin (b) in the W layer based on the amount of the whole of the W layer.

If $(X+Y)/Z$ is less than 0.01, the finely dispersing effect of the addition of the amorphous polyester resin (a2) may be insufficient, so that the reflection properties may tend to be significantly reduced, or the film forming ability may tend to be reduced. If it is more than 0.33 and less than 0.37, the reflectivity may not be improved, and the heat resistance may tend to be reduced. If it is more than 0.75, the heat resistance of the film may be significantly reduced, which is not preferred. When it is in the range of more than 0.01 to 0.33, a reflective film having high reflection properties and particularly high heat resistance is provided. When it is in the range of more than 0.37 to 0.75, a reflective film having high heat resistance and particularly high reflection properties is provided. It is more preferably more than 0.05 to 0.33 or more than 0.37 to 0.62.

Besides the amorphous/crystalline polyester resin (a1, a2) as the polyester resin component (A) and the cyclic-olefin resin (b) as the incompatible component (B), a dispersing agent (C) is preferably added to the white polyester film so that the cyclic-olefin resin (b) as the incompatible component (B) can be more finely dispersed.

When the dispersing agent (C) is added, the cyclic-olefin resin (b) can be dispersed in smaller diameters, and therefore finer flat voids formed by stretching can be finely dispersed, so that the whiteness, reflectivity, or lightness of the film can be improved.

Examples of the dispersing agent (C) that may be used include, but are not limited to, an olefin polymer or copolymer having a polar group such as a carboxyl or epoxy group or a functional group reactive with polyester; diethylene glycol, polyalkylene glycol, a surfactant, a heat-sensitive adhesive resin, and so on. Of course, these may be used singly or in combination of two or more thereof.

In particular, a polyester-polyalkylene glycol copolymer including a polyester component and a polyalkyleneglycol component is preferred, and a crystalline polyester-polyalkyleneglycol copolymer (c1) is more preferred.

In this case, the polyester component preferably includes an aliphatic diol component of 2 to 6 carbon atoms and a terephthalic acid component and/or an isophthalic acid component. The polyalkylene glycol component is preferably a polyethylene glycol component, a polypropylene glycol component, a polytetramethylene glycol component, or the like.

In a particularly preferred mode, polyethylene terephthalate or polybutylene terephthalate is used as the polyester component in combination with polyethylene glycol or polytetramethylene glycol as the polyalkylene glycol component. In particular, polybutylene terephthalate is preferably used as the polyester component in combination with polytetramethylene glycol as the polyalkylene glycol component, or polyethylene terephthalate is preferably used as the polyester component in combination with polyethylene glycol as the polyalkylene glycol component.

The added amount Cw of the dispersing agent (C) is preferably, but not limited to, 0.1 to 30% by weight, more preferably 2 to 25% by weight, even more preferably 5 to 20% by weight, based on the amount of the white polyester layer (W layer) containing voids.

If the added amount Cw is less than 0.1% by weight, the effect of making fine voids may be reduced. If the added amount Cw is more than 30% by weight, the problem of a reduction in production stability, an increase in cost, or the like may occur.

The sum (a1w+c1w) of the content a1w of the crystalline polyester resin (a1) and the content c1w of the crystalline polyester-polyalkyleneglycol copolymer (c1) is preferably less than 50% by weight, based on the amount of the white polyester layer (W layer).

In this range, the film forming ability and the mechanical properties can be maintained, while the above effect of dispersing the incompatible component (B) is sufficiently produced.

99% by number or more of the cyclic-olefin resin (b) dispersions in the white polyester layer (W layer) preferably have a dispersion size (diameter) of 7 µm or less. Namely, the content of dispersions having dispersion sizes of more than 7 µm is preferably less than 1% by number. If the content of dispersions having dispersion sizes (diameters) of more than 7 µm is more than 1%, coarse voids may increase so that a low level of whiteness, light reflectivity or lightness may be provided.

The content of dispersions having dispersion sizes of more than 4 µm is more preferably less than 1% by number, and the content of dispersions having dispersion sizes of more than 2 µm is even more preferably less than 1% by number. Therefore, 99% by number or more of the dispersions more preferably have dispersion sizes (diameters) of 4 µm or less, even more preferably 2 µm or less.

When the dispersion sizes are in the above range, a large number of voids can be efficiently formed in the film, so that a high level of whiteness, reflectivity or lightness can be provided.

In a non-limited manner, 99% by number or more of the cyclic-olefin resin (b) dispersions in the white polyester layer (W layer) preferably have dispersion sizes (diameters) of 0.1 µm or more. If they are less than 0.1 µm, the desired whiteness or light reflectivity may not be obtained in some cases, because they are significantly smaller than the visible light wavelength, and therefore even when voids are formed in the film, the thickness of voids in the thickness direction is significantly smaller than the visible light wavelength, so that the efficiency of visible light reflection at the interfaces is reduced.

The dispersion size may be measured by the method described below. First, the film is cut using a microtome in such a manner that the cross-section of the film is not deformed in the thickness direction, and a magnified image of the observed cross-section is obtained using an electron microscope. At this time, the film is cut parallel to the TD direction (transverse direction). In the image, the maximum length of the cyclic-olefin resin (b) in the white polyester layer (W layer) is measured in the film surface direction and defined as the dispersion size.

Examples of methods for adjusting the dispersion size of the cyclic-olefin resin (b) in the above range include, but are not limited to, (1) raising the glass transition temperature of the cyclic-olefin resin (b), (2) adding the amorphous polyester resin (a2) to the polyester resin component (A), and (3) adding the dispersing agent (C).

In an extrusion process, the screw speed of the extruder is preferably high, and the time for which shearing is applied in the screw unit is preferably long. When the screw speed and the extrusion time are set high and long, respectively, the cyclic-olefin resin (b) is well dispersed in the polyester resin component (A), so that the dispersion sizes tend to be small and uniform.

In addition, allowing the resin to pass once through a filter with an average mesh size of 40 μm or less in the extrusion process is also effective in making the dispersion sizes fine and uniform.

Preferably, a thermoplastic resin layer such as a polyester layer is formed, by coextrusion or any other method, on at least one side of the white polyester layer (W layer) of the film in which voids are formed by the above method. The formation of the thermoplastic resin layer on the film can impart surface smoothness and high mechanical strength to the film.

In this process, organic or inorganic fine particles or the incompatible resin may be added to the thermoplastic resin layer formed on the film. In this case, stretching may be performed in at least one direction in the process of producing the film, so that voids can also be formed in the thermoplastic resin layer formed thereon.

To impart easy adhesion properties, antistatic properties or the like to the white polyester film, well-known techniques may be used to apply various coating liquids or form a hard coat layer to increase impact resistance.

Examples of coating methods include gravure coating, roll coating, spin coating, reverse coating, bar coating, screen coating, blade coating, air knife coating, and dipping. After the coating process, the coating layer may be cured using known methods such as heat curing, methods using active rays such as ultraviolet rays, electron beams or radioactive rays, and combinations thereof. In this case, a curing agent such as a cross-linking agent is preferably used in combination with the methods. The coating layer may be formed by a coating method at the time of the base film production (in-line coating) or a method of forming a coating on the white polyester film after the completion of crystal orientation (off-line coating).

Various types of particles for increasing the surface smoothness or the running durability during the film production may also be added to the white polyester film.

Particle species that may be used is preferably, but not limited to, silica, barium sulfate, titanium dioxide, calcium carbonate, or the like.

In general, the white polyester film preferably has a high degree of whiteness and preferably has a bluish color tone rather than a yellowish color tone. In view of this point, a fluorescent brightening agent is preferably added to the white polyester film.

An appropriate commercially-available fluorescent brightening agent may be used, such as UVITEX (manufactured by Ciba-Geigy Corporation), OB-1 (manufactured by Eastman Chemical Company), TBO (manufactured by SUMITOMO SEIKA CHEMICALS CO., LTD.), Keikol (manufactured by NIPPON SODA CO., LTD.), Kayalight (manufactured by NIPPON KAYAKU CO., LTD.), and Leucophor EGM (manufactured by Clariant (Japan) K.K.). The content of the fluorescent brightening agent in the film is preferably from 0.005 to 1% by weight, more preferably from 0.007 to 0.7% by weight, even more preferably from 0.01 to 0.5% by weight. If it is less than 0.005% by weight, its effect may be small. If it is more than 1% by weight, the film may have a yellowish color. When the white polyester film is a laminated film, the fluorescent brightening agent may be more effectively added to the surface part.

The white polyester film may also contain a photostabilizer. When a photostabilizer is added, ultraviolet-induced changes in the color of the film can be prevented. While any photostabilizer that does not degrade other properties may be preferably used, it is recommended that a photostabilizer having high heat resistance, being compatible with the polyester resin, uniformly dispersible, and less colored, and not affecting the reflection properties of the resin and the film be selected. Examples of such a photostabilizer include ultraviolet absorbers such as a salicylate type, a benzophenone type, a benzotriazole type, a cyanoacrylate type, and a triazine type, and ultraviolet stabilizers such as a hindered amine type. Specific examples include salicylate type ultraviolet absorbers such as p-tert-butylphenyl salicylate and p-octylphenyl salicylate; benzophenone type ultraviolet absorbers such as 2,4-dihydroxybenzophenone, 2-hydroxy-4-methoxybenzophenone, 2-hydroxy-4-methoxy-5-sulfobenzophenone, 2,2',4,4'-tetrahydroxybenzophenone, bis(2-methoxy-4-hydroxy-5-benzoylphenyl)methane; benzotriazole type ultraviolet absorbers such as 2-(2'-hydroxy-5'-methylphenyl)benzotriazole, 2-(2'-hydroxy-5'-methylphenyl)benzotriazole, and 2,2'-methylenebis[4-(1,1,3,3-tetramethylbutyl)-6-(2H-benzotriazole-2-yl)phenol]; cyanoacrylate type ultraviolet absorbers such as ethyl-2-cyano-3,3'-diphenyl acrylate; and triazine type ultraviolet absorbers such as 2-(4,6-diphenyl-1,3,5-triazine-2-yl)-5-[(hexyl)oxy]-phenol.

Examples of ultraviolet stabilizers include hindered amine type ultraviolet stabilizers such as bis(2,2,6,6-tetramethyl-4-piperidyl) sebacate, dimethyl succinate-1-(2-hydroxyethyl)-4-hydroxy-2,2,6,6-tetramethylpiperidine polycondensate, and other ultraviolet stabilizers such as nickelbis(octylphenyl)sulfide and 2,4-di-tert-butylphenyl-3',5'-di-tert-butyl-4'-hydroxybenzoate. Among these photostabilizers, 2,2',4,4'-tetrahydroxy-benzophenone, bis(2-methoxy-4-hydroxy-5-benzoylphenyl)methane, 2,2'-methylenebis[4-(1,1,3,3-tetramethylbutyl)-6-(2H-benzotriazole-2-yl)phenol], and 2-(4,6-diphenyl-1,3,5-triazine-2-yl)-5-[(hexyl)oxy]-phenol are highly compatible with polyester and therefore preferably used. The photostabilizers may be used singly or in combination of two or more thereof.

The content of the photostabilizer in the white polyester film is preferably from 0.05 to 10% by weight, more preferably from 0.1 to 5% by weight, even more preferably from 0.15 to 3% by weight, based on the amount of the photostabilizer-containing layer. If the content of the photostabilizer is less than 0.05% by weight, the light resistance may be insufficient so that the color tone may significantly change during long-term storage. If it is more than 10% by weight, the color tone of the film may be changed by coloration with the photostabilizer.

A coating layer having ultraviolet absorbing ability is preferably formed on at least one side so that yellowing of the film during long-term use can be prevented. The ultraviolet absorbing layer may be a single layer or a plurality of layers. In the case of a plurality of layers, any one of the layers is an ultraviolet absorber-containing layer, and in view of maintaining light resistance, two or more of the layers are preferably ultraviolet absorber-containing layers. The ultraviolet absorbing layer may be obtained by adding or copolymerizing an ultraviolet absorber (such as a benzophenone type, a benzotriazole type, a triazine type, a cyanoacrylate type, a salicylate type, or a benzoate type) or an inorganic ultraviolet blocker or the like into a resin component such as a thermoplastic resin, a thermosetting resin, or an active ray-curable resin and forming a layer of the resin. In particular, a benzotriazole type ultraviolet absorber is more preferred.

Any benzotriazole type ultraviolet absorbing monomer having a benzotriazole moiety in the basic skeleton and having an unsaturated double bond may be used. Preferred examples of such a monomer include 2-(2'-hydroxy-5'-acryloyloxyethylphenyl)-2H-benzotriazole, 2-(2'-hydroxy-5'-methacryloxyethylphenyl)-2H-benzotriazole, and 2-(2'-hydroxy-3'-tert-butyl-5'-acryloyloxyethylphenyl)-5-chloro-2H-benzotriazole. Examples of an acrylic monomer and/or oligomer copolymerizable with these monomers include alkyl acrylate, alkyl methacrylate, and cross-linkable functional group-containing monomers such as monomers having a carboxyl group, a methylol group, an acid anhydride group, a sulfonic acid group, an amide group, an amino group, a hydroxyl group, an epoxy group, or the like.

In the coating layer having ultraviolet absorbing ability, which is preferably used, one or more of the acrylic monomers and/or oligomers may be copolymerized in any ratio. In view of the hardness of the laminated film, methyl methacrylate or styrene is preferably polymerized in an amount of 20% by weight or more, more preferably 30% by weight or more, based on the amount of an acrylic monomer. Concerning the copolymerization ratio between the benzotriazole type monomer and the acrylic type monomer, the ratio of the benzotriazole type monomer is preferably from 10 to 70% by weight, more preferably from 20 to 65% by weight, even more preferably from 25 to 60% by weight, in view of durability or adhesion to the base film. The molecular weight of the copolymer is preferably, but not limited to, 5,000 or more, more preferably 10,000 or more, in view of the durability of the coating layer. The copolymer may be produced by any appropriate method such as radical polymerization. The copolymer may be applied in the form of a dispersion in an organic solvent or water to the base film, and the thickness of the layer formed thereon is generally from 0.5 to 15 μm, preferably from 1 to 10 μm, more preferably from 1 to 5 μm, particularly in view of light resistance.

Organic particles and/or inorganic particles for controlling the surface glossiness or the like may be added to the coating layer having ultraviolet absorbing ability. Inorganic particles may be made of silica, alumina, titanium dioxide, zinc oxide, barium sulfate, calcium carbonate, zeolite, kaolin, talc, or the like. Organic particles may be made of a silicone compound, cross-linked styrene, cross-linked acrylic, cross-linked melamine, or the like. The organic particles and/or inorganic particles preferably have a particle size (number average particle size) of 0.05 to 15 μm, more preferably 0.1 to 10 μm. The content of the particles is preferably from 5 to 50% by weight, more preferably from 6 to 30% by weight, even more preferably from 7 to 20% by weight, based on the dry weight of the coating layer having ultraviolet absorbing ability. The size of the particles is preferably in the above range, so that the particles can be prevented from dropping off and the surface glossiness can be controlled.

Various types of additives may be added to the coating layer having ultraviolet absorbing ability, as long as the effects are not inhibited. Examples of such additives include a fluorescent brightening agent, a cross-linking agent, a heat stabilizer, an electrification inhibitor, a coupling agent, and the like.

The coating layer having ultraviolet absorbing ability may be formed by any coating method. For example, gravure coating, roll coating, spin coating, reverse coating, bar coating, screen coating, blade coating, air knife coating, dipping, extrusion lamination, or the like may be used. In particular, a kiss coating method with a micro-gravure roll is preferred, because of good coating appearance and highly uniform glossiness. After the coating process, the coating layer may be cured using known methods such as heat curing, methods using active rays such as ultraviolet rays, electron beams or radioactive rays, and combinations thereof. A heat curing method with a hot air oven or an ultraviolet curing method by ultraviolet irradiation is preferred. The coating layer may be formed by a coating method at the time of the base film production (in-line coating) or a method of forming a coating on the base film after the completion of crystal orientation (off-line coating).

The white polyester film preferably has a specific gravity of 0.4 to 1.5, more preferably 1.3 or less. If the specific gravity is less than 0.4, the film may have a disadvantage such as insufficient mechanical strength, buckling tendency, or low handleability. If it is more than 1.5, the void occupancy may be too low so that low reflectivity may be provided and that the film may tend to produce insufficient brightness, when used as a reflecting plat in a surface light source.

The white polyester film preferably has a thickness of 10 to 500 μm, more preferably 20 to 300 μm. If the thickness is less than 10 μm, it may be difficult to ensure the flatness of the film, so that uneven brightness may be easily produced, when the film is used in a surface light source. If the thickness is more than 500 μm, a liquid crystal display in which the film is used as a light reflecting film may be too thick.

When the film is a laminated film, the thickness ratio of its surface part/its internal part is preferably from 1/200 to 1/3, more preferably from 1/50 to 1/4. In the case of a three-layer laminated film having the structure surface part/internal part/surface part, the ratio is expressed by the total thickness of both surface parts/the thickness of the internal part. The white polyester film layer (W layer) is preferably an internal layer in view of whiteness or light reflectivity.

Based on the above description, preferred examples of the content of each component are illustrated below. Preferred are 5% by weight to 50% by weight of the cyclic-olefin resin (b) having a glass transition temperature of 110° C. or more, 10% by weight to less than 50% by weight of the crystalline polyester resin (a1), 10% by weight to 50% by weight of the amorphous polyester resin (a2), and 0.1% by weight to 30% by weight of the dispersing agent (C) (preferably a crystalline polyester-polyalkyleneglycol copolymer (c1)), based on the amount of the white polyester layer (W layer).

More preferred are 20% by weight to 40% by weight of the cyclic-olefin resin (b) having a glass transition temperature of 110° C. or more, 15% by weight to 45% by weight of the crystalline polyester resin (a1), 15% by weight to 40% by weight of the amorphous polyester resin (a2), and 2% by weight to 25% by weight of the dispersing agent (C) (preferably a crystalline polyester-polyalkyleneglycol copolymer (c1)), based on the amount of the white polyester layer (W layer).

Particularly preferred are 25% by weight to 35% by weight of the cyclic-olefin resin (b) having a glass transition temperature of 110° C. or more, 20% by weight to 45% by weight of the crystalline polyester resin (a1), 20% by weight to 30% by weight of the amorphous polyester resin (a2), and 5% by weight to 20% by weight of the dispersing agent (C) (preferably a crystalline polyester-polyalkyleneglycol copolymer (c1)), based on the amount of the white polyester layer (W layer).

An exemplary method for producing the white polyester film is described below, which is not intended to limit the scope of this disclosure.

A film producing machine equipped with an extruder (main extruder) is used to form the white polyester layer (W layer). A mixture of chips of the polyester resin component (A) and the cyclic-olefin resin (b) having a glass transition temperature of 110° C. or more (if necessary, each vacuum-dried sufficiently) is supplied to the extruder being heated. The cyclic-olefin resin (b) may be added in the form of master chips, which are prepared in advance by uniformly melting and kneading the mixture, or added directly to the kneading and extruding machine.

When a laminated film is produced, the process may include using a composite film-producing machine equipped with a sub-extruder as well as the main extruder, supplying, to the sub-extruder being heated, thermoplastic resin chips (if necessary, vacuum-dried sufficiently), inorganic particles, and a fluorescent brightening agent, and performing coextrusion to form a laminate.

The process of melt extrusion preferably includes filtering the melt through a filter with a mesh size of 40 μm or less, then introducing the melt into a T die, and forming a melt laminated sheet by extrusion.

The melt laminated sheet is electrostatically fixed, cooled and solidified on a drum cooled to a surface temperature of 10 to 60° C., so that an unstretched laminated film is obtained. The unstretched laminated film is guided to a group of rolls being heated to a temperature of 70 to 120° C., stretched to 3 to 4 times in the longitudinal direction (machine direction, namely, the direction in which the film moves), and cooled to a temperature of 20 to 50° C. in a group of rolls.

Subsequently, the film is guided to a tenter, while both ends of the film are held with clips, and the film is stretched to 3 to 4 times in a direction (transverse direction) perpendicular to the longitudinal direction in an atmosphere heated at a temperature of 90 to 150° C.

While the stretch ratio may be 3 to 5 times in each of the longitudinal and transverse directions, the area stretch ratio (longitudinal stretch ratio×transverse stretch ratio) is preferably from 9 to 15 times. If the area stretch ratio is less than 9 times, the resulting biaxially-stretched laminated film may have an insufficient level of reflectivity, opacity or strength. If the area stretch ratio is more than 15 times, breaking may tend to occur.

In the resulting biaxially-stretched laminated film, crystal orientation should be completed so that flatness and dimensional stability can be provided. For this purpose, the film is subsequently heat-treated in the tenter at a temperature of 150 to 240° C. for 1 to 30 seconds, then uniformly and slowly cooled, and then cooled to room temperature. Thereafter, corona discharge treatment or the like is optionally performed to increase adhesion to other materials, and the film is wound up, so that the white polyester film is obtained. In the heat treatment process, if necessary, the film may be relaxed by 3 to 12% in the transverse or longitudinal direction.

In general, the thermal dimensional stability is increased with increasing the heat treatment temperature. In the film manufacturing process, therefore, the white polyester film is preferably heat-treated at high temperature (210° C. or more). It is because the white polyester film should have a certain level of thermal dimensional stability. The white polyester film may be used as a reflective film of a surface light source (backlight) incorporated in a liquid crystal display, and therefore, in a certain backlight, the temperature of the internal atmosphere may be raised to about 100° C.

For the heat treatment at 210° C. or more, the cyclic-olefin resin (b) should preferably have a glass transition temperature of 150° C. or more, more preferably 170° C. or more, even more preferably 190° C. or more.

When the glass transition temperature is in this range, the cyclic-olefin resin (b) as a nucleating agent for voids is prevented from being thermally deformed (crashed), so that stable voids is maintained, and as a result, a film having high thermal dimensional stability as well as a high level of whiteness, light reflectivity or lightness is obtained.

While the biaxial stretching may be sequential biaxial stretching or simultaneous biaxial stretching, simultaneous biaxial stretching can prevent the film from breaking in the manufacturing process or is less likely to cause transfer defects, which would otherwise be caused by adhesion of the film to a heating roll. After the biaxial stretching, the film may be stretched again in either of the longitudinal and transverse directions.

A coating layer having ultraviolet absorbing ability is optionally formed on the resulting white polyester film by kiss coating with a micro-gravure cylinder, dried at 80 to 140° C., and then subjected to ultraviolet irradiation so that the coating layer is cured. Before the layer having ultraviolet absorbing ability is formed by coating, pretreatment for forming an adhesion facilitating layer, an antistatic layer or the like may be performed.

To impart electromagnetic wave shielding properties, foldability or the like, aluminum, silver or the like may be deposited on the surface of the white polyester film by metal deposition, bonding or any other method.

The white polyester film is preferably used as a sheet-shaped material to reflect light, which is incorporated into a surface light source. More specifically, the white polyester film is preferably used as a reflecting plate in an edge light for a liquid crystal screen, a reflecting plate in a direct light type surface light source, a reflector around a cold cathode fluorescent lamp, or the like.

Measurement Methods (1) Crystallinity and Glass Transition Temperature of Resins (JIS K 7121 (1987), JIS K 7122 (1987))

Using a differential scanning calorimeter RDC220 Robot DSC (Seiko Instruments Inc.), the resin was heated from 25° C. to 300° C. at a heating rate of 20° C./minute under a nitrogen atmosphere, and the heated state was maintained for 10 minutes. The resin was then quenched to 25° C. or lower and then heated again from room temperature to 300° C. at a heating rate of 20° C./minute so that endothermic and exothermic curves (DSC curve) were obtained.

Using the endothermic and exothermic curves, the resin having a measured heat of fusion of crystal of 1 cal/g or more was determined to be a crystalline resin, while a resin having a measured heat of fusion of crystal of less than 1 cal/g was determined to be an amorphous resin.

The calorimetry was based on JIS K 7122 (1987). The midpoint glass transition temperature (Tmg) according to JIS K 7121 (1987) was adopted at the glass transition temperature (Tg).

(2) Dispersion Size (Diameter) of Cyclic-Olefin Resin (b)

The film was cut using a microtome in such a manner that the cross-section of the film was not deformed in the thickness direction. At this time, the film was cut parallel to the TD direction (transverse direction) of the film. Using a field emission scanning electron microscope JSM-6700F (JEOL DATUM LTD.), the cut section was observed at a magnification of 3,000 times. From the resulting image, 1,000 dispersions of the cyclic-olefin resin (b) in the white polyester layer (W layer) were randomly selected. The maximum length of each dispersion was measured in the film surface direction and determined to be the dispersion size of each dispersion. The simple average of the resulting dispersion sizes of the 1,000 dispersions was calculated as the dispersion size of the cyclic-olefin resin (b).

In addition, the number ratio of the dispersions with dispersion sizes of 7 μm or more and the number ratio of the dispersions with dispersion sizes of 2 μm or more were calculated.

(3) Reflectivity

The optical reflectivity at 560 nm was determined using a spectrometer U-3410 (Hitachi, Ltd.) equipped with a ϕ60 integrating sphere 130-0632 (Hitachi, Ltd.) and a 10°-inclined spacer. The optical reflectivity was determined for both sides of the white polyester film, and the higher value was used as the optical reflectivity of the white polyester film. The standard white plate used was Part No. 210-0740 manufactured by Hitachi Instruments Service Co., Ltd.).

(4) Transmittance

The total transmittance in the film thickness direction was measured using a fully-automatic, direct-reading, haze computer HGM-2DP (manufactured by Suga Test Instruments Co., Ltd.). The transmittance was determined for both sides of the white polyester film, and the lower value was used as the transmittance of the white polyester film.

(5) Heat Resistance

The white polyester film was incorporated into a backlight. The lamp was continuously lighted for 200 hours under an environment kept at 40° C. The film was then taken out of the backlight, mounted on a horizontal table, and visually observed for a change in its flatness. The backlight used was a straight-tube, single side light type backlight (14.1 inches), which was used in a notebook computer provided for evaluation. The distorted film having a rising portion 3 mm or more apart from the horizontal table was evaluated as "C." The film having a rising portion 2 to 3 mm apart therefrom was evaluated as "B." The film having a rising portion 1 to 2 mm apart therefrom was evaluated as "A." The film with a rising of less than 1 mm was evaluated as "S." "S" and "A" are acceptable.

(6) Stretchability

The film having few unevenly stretched portions in the film manufacturing process of each Example or Comparative Example was evaluated as "S." The film having a few unevenly stretched portions was evaluated as "A." The film having some unevenly stretched portions that were not visible in the film manufacturing process was evaluated as "B." The film having unevenly stretched portions that were visible in the film manufacturing process was evaluated as "C." The film productivity evaluated as "S" to "B" is necessary for mass production.

As used herein, the term "unevenly stretched portion" means that the stretched film has significantly thin and thick portions. Unevenly stretched portions are often formed, when the whole of the film is not uniformly stretched but unevenly stretched in the stretching process. There may be various causes of unevenly stretched portions. Unevenly stretched portions tend to be formed when the incompatible resin is unstably dispersed in the polyester resin component. When unevenly stretched portions are formed, the reflectivity or the like often differs between the thin and thick portions of the film, which may be undesirable.

(7) Film Productivity

The case where breaking of the film hardly occurred in the film manufacturing process of each Example or Comparative Example was evaluated as "S." The case where breaking of the film slightly occurred was evaluated as "A." The case where breaking of the film occurred to some extent was evaluated as "B." The case where breaking of the film frequently occurred was evaluated as "C." The film productivity evaluated as "S" to "B" is necessary for mass production, and "S" and "A" are effective for cost reduction.

(8) Brightness

The white polyester film prepared in each of Examples and Comparative Examples was placed as a reflecting plate in a 20 inch-sized, direct-type backlight (16 fluorescent tubes, 3 mm in fluorescent tube diameter, 2.5 cm in space between fluorescent tubes, 1.5 cm in distance between a milky-white plate and a fluorescent tube). A milky-white plate RM401 (manufactured by Sumitomo Chemical Co., Ltd.) was also placed, and a light diffusing sheet LIGHT-UP (registered trademark) GM3 (manufactured by KIMOTO) and prism sheets BEF III (manufactured by 3M Company) and DBEF-400 (manufactured by 3M Company) were placed above the milky-white plate.

A voltage of 12 V was then applied to turn on CCFL so that the surface light source was turned on. After 50 minutes, the central brightness was measured with a color brightness meter BM-7/FAST (manufactured by TOPCON CORPORATION) at a viewing angle of 1° with a backlight-brightness meter distance of 40 cm. The measurement was performed on three samples of each of Examples and Comparative Examples, and each average was calculated and used as the brightness.

EXAMPLES

The white films and methods are more specifically described by the examples below and so on, which are not intended to limit the scope of this disclosure.

Materials

A. Polyester Resin Component (A)

PET

Terephthalic acid and ethylene glycol were used as acid and diol components, respectively. Antimony trioxide (polymerization catalyst) was added thereto in such an amount that the amount of the antimony atom would be 300 ppm based on the amount of the resulting polyester pellets, and a polycondensation reaction was carried out so that polyethylene terephthalate (PET) pellets with an intrinsic viscosity of 0.63 dl/g and a terminal carboxyl group content of 40 equivalents/ton were obtained. Its heat of fusion of crystal was 1 cal/g or more as measured with a differential scanning calorimeter, and it was a crystalline polyester resin (a1) with a melting point of 255° C.

CHDM (Cyclohexanedimethanol) Copolymerized PET

PETG 6763 (manufactured by Eastman Chemical Company) was used. It is a PET in which 33% by mole of cyclohexanedimethanol is copolymerized as a diol component. Its heat of fusion of crystal was less than 1 cal/g as measured with a differential scanning calorimeter, and it was an amorphous polyester resin (a2).

CHDM copolymerized PETs with copolymerized cyclohexanedimethanol contents other than 33% by mole were each prepared by a process including: using terephthalic acid as a dicarboxylic acid component, using, as diol components, cyclohexanedimethanol in the amount shown in Table 2 or 3 based on 100% by mole of the diol components and the balance amount of ethylene glycol; adding antimony trioxide (polymerization catalyst) thereto in such an amount that the amount of the antimony atom would be 300 ppm based on the amount of the resulting polyester pellets; and carrying out a polycondensation reaction so that a copolyester with an intrinsic viscosity of 0.77 dl/g and a terminal carboxyl group content of 40 equivalents/ton was obtained. The resulting copolyesters each had a heat of fusion of crystal of less than 1 cal/g as measured with a differential scanning calorimeter, and they were all amorphous polyester resins (a2).

CHDA (Cyclohexanedicarboxylic Acid) Copolymerized PET

The dicarboxylic acid components used were cyclohexanedicarboxylic acid in the amount shown in Table 3 based on 100% by mole of the dicarboxylic acid components and the balance amount of terephthalic acid. Ethylene glycol was used as a diol component. Antimony trioxide (polymerization catalyst) was added thereto in such an amount that the amount of the antimony atom would be 300 ppm based on the amount of the resulting polyester pellets, and a polycondensation reaction was carried out so that a copolyester with an intrinsic viscosity of 0.77 dl/g and a terminal carboxyl group content of 40 equivalents/ton was obtained. The resulting copolyesters each had a heat of fusion of crystal of less than 1 cal/g as measured with a differential scanning calorimeter, and they were all amorphous polyester resins (a2).

Isophthalic Acid Copolymerized PET

The dicarboxylic acid components used were 77% by mole of terephthalic acid and 23% by mole of isophthalic acid, and ethylene glycol was used as a diol component. Antimony trioxide (polymerization catalyst) was added thereto in such an amount that the amount of the antimony atom would be 300 ppm based on the amount of the resulting polyester pellets, and a polycondensation reaction was carried out so that a copolyester with an intrinsic viscosity of 0.63 dl/g and a terminal carboxyl group content of 40 equivalents/ton was obtained. Its heat of fusion of crystal was less than 1 cal/g as measured with a differential scanning calorimeter, and it was an amorphous polyester resin (a2).

B. Incompatible Component (B)

PMP (Polymethylpentene)

TPX DX820 (manufactured by Mitsui Chemicals, Inc.) was used. Its heat of fusion of crystal was 1 cal/g or more as measured with a differential scanning calorimeter, and it was a crystalline resin with a melting point of 235° C. Its glass transition temperature was 25° C.

Cyclic-Olefin Resins (b) (Copolymers)

TOPAS 8007, TOPAS 6013, TOPAS 6015, TOPAS 6017, and TOPAS 6018 (all manufactured by Polyplastics Co., Ltd.) were used. As shown by Chemical Formula 1, these resins are each composed of a norbornene component and an ethylene component. The ratio of each component and the glass transition temperature are shown in the table.

As shown in the table, TOPAS 6013, TOPAS 6015, TOPAS 6017, and TOPAS 6018 each have a glass transition temperature of 110° C. or more and therefore each correspond to the cyclic-olefin resin (b) having a glass transition temperature of 110° C. or more. All these resins had a heat of fusion of crystal of less than 1 cal/g as measured with a differential scanning calorimeter, and they were amorphous resins.

Chemical Formula 1

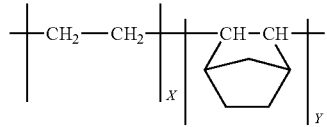

C. Dispersing Agents (C)

PET-PEG (Polyethylene Glycol) Copolymer

This is in the form of PET pellets in which 6% by weight of polyethylene glycol with a molecular weight of 4,000 is copolymerized. It has a heat of fusion of crystal of 1 cal/g or more as measured with a differential scanning calorimeter, and it is a crystalline resin. Therefore, it corresponds to the crystalline polyester-polyalkyleneglycol copolymer (c1).

PBT-PAG (Polyalkylene Glycol) Copolymer

Hytrel 7247 (manufactured by DU PONT-TORAY CO, LTD.) was used. This resin is a block copolymer of PBT (polybutylene terephthalate) and PAG (mainly polytetramethylene glycol). It has a heat of fusion of crystal of 1 cal/g or more as measured with a differential scanning calorimeter, and it is a crystalline resin. Therefore, it corresponds to the crystalline polyester-polyalkyleneglycol copolymer (c1).

Examples 1 to 12, 15, 16, and 19 to 34

Each mixture of the materials shown in the table was dried under vacuum at a temperature of 170° C. for 5 hours and then supplied to an extruder. The mixture was melted and extruded at a temperature of 280° C., then filtered through a 30 μm cut-off filter, and then introduced into a T die.

The mixture was then extruded from the T die into a melt monolayer sheet. The melt monolayer sheet was fixed by static electricity application method, cooled, and solidified on a drum kept at a surface temperature of 20° C., so that an unstretched monolayer film was obtained. Subsequently, the unstretched monolayer film was preheated in a group of rolls heated at a temperature of 85° C. and then stretched to 3.3 times in the longitudinal direction (machine direction) with a heating roll at a temperature of 90° C. The film was then cooled in a group of rolls at a temperature of 25° C. so that a uniaxially stretched film was obtained.

The resulting uniaxially stretched film was guided to a preheating zone at a temperature of 95° C. in a tenter, while both ends of it were held with clips. Subsequently, in a heating zone at a temperature of 105° C., the film was continuously stretched to 3.2 times in a direction (transverse direction) perpendicular to the longitudinal direction. At the heat treatment zone in the tenter, the film was subsequently heat-treated at the temperature shown in the table for 20 seconds and relaxed by 4% in the transverse direction at a temperature of 180° C. The film was further relaxed by 1% in the transverse direction at a temperature of 140° C. After uniformly and slowly cooled, the film was then wound up, so that a 100 μm thick (55 μm thick only in Example 19) white monolayer polyester film was obtained. The white polyester film has a large number of fine voids inside and corresponds to the white polyester layer (W layer) by itself. Various properties of the film are shown in the table. As shown in the tables, the white polyester films had a high level of properties including whiteness, reflectivity, lightness, and thermal dimensional stability.

Examples 13, 14, 17, 18, and 35 to 41

Each mixture of the materials shown in the table was dried under vacuum at a temperature of 170° C. for 5 hours in a composite film-producing machine having a main extruder and a sub-extruder. The mixture was then supplied to the main extruder, melted and extruded, at a temperature of 280° C., then filtered through a 30 μm cut-off filter, and then introduced into a composite T die.

On the other hand, PET, which was dried under vacuum at a temperature of 170° C. for 5 hours, was supplied to the sub-extruder, melted and extruded at a temperature of 280° C., then filtered through a 30 μm cut-off filter, and then introduced into the composite T die.

In the composite T die, the materials were joined together in such a manner that resin layers (A) extruded from the sub-extruder were placed on both sides of a resin layer (B) extruded from the main extruder to form a laminate (A/B/A). As a result, the materials were coextruded into a sheet, so that a melt laminated sheet was obtained. The melt laminated sheet was fixed by electrostatic method, cooled, and solidified on a drum kept at a surface temperature of 20° C., so that an unstretched laminated film was obtained. Subsequently, the unstretched laminated film was preheated in a group of rolls heated at a temperature of 85° C. according to a conventional method and then stretched to 3.3 times in the longitudinal direction (machine direction) with a heating roll at a temperature of 90° C. The film was then cooled in a group of rolls at a temperature of 25° C. so that a uniaxially stretched film was obtained.

The resulting uniaxially stretched film was guided to a preheating zone at a temperature of 95° C. in a tenter, while both ends of it were held with clips. Subsequently, in a heating zone at a temperature of 105° C., the film was continuously stretched to 3.2 times in a direction (transverse direction) perpendicular to the longitudinal direction. At the heat treatment zone in the tenter, the film was subsequently heat-treated at the temperature shown in the table for 20 seconds and relaxed by 4% in the transverse direction at a temperature of 180° C. The film was further relaxed by 1% in the transverse direction at a temperature of 140° C. After uniformly and slowly cooled, the film was then wound up, so that a white laminated polyester film with a total thickness of 110 μm (composed of layer A/layer B/layer A=5/100/5 (μm)) was obtained. The layer B has a large number of fine voids inside and corresponds to the white polyester layer (W layer). Various properties of the film are shown in the table. As shown in the tables, the white polyester films had a high level of properties including whiteness, reflectivity, lightness, and thermal dimensional stability.

Comparative Example 1

A mixture of the materials shown in the table was dried under vacuum at a temperature of 170° C. for 5 hours and then supplied to an extruder. The mixture was melted and extruded at a temperature of 280° C., then filtered through a 30 μm cut-off filter for removal of foreign matter, and then introduced into a T die.

The mixture was then extruded from the T die into a melt monolayer sheet. The melt monolayer sheet was fixed by static electricity application method, cooled, and solidified on a drum kept at a surface temperature of 20° C., so that an unstretched monolayer film was obtained. The resulting polyester film had almost no void inside, and its properties were at a low level as shown in the table.

Comparative Examples 2 to 6

Film production was performed using the materials shown in the table in the same manner as in Example 1, so that polyester films were obtained (only in Comparative Example 5, the thickness of the film was 55 μm). The resulting polyester films each had some voids inside, but their properties were at a low level as shown in the table.

Comparative Example 7

Film production was attempted using the materials shown in the table in the same manner as in Example 13. However, the film was frequently broken, and no white polyester film was obtained after the stretching process.

TABLE 1

| Type | Norbornene component content (% by weight) | Ethylene component content (% by weight) | Glass transition temperature (° C.) |
|---|---|---|---|
| TOPAS8007 | 65 | 35 | 80 |
| TOPAS6013 | 77 | 23 | 140 |
| TOPAS6015 | 80 | 20 | 160 |
| TOPAS6017 | 82 | 18 | 180 |
| TOPAS6018 | 84 | 16 | 190 |

TABLE 2

| | Polyester resin component (A) | | | | | | | |
|---|---|---|---|---|---|---|---|---|
| | Crystalline polyester (a1) | | | Amorphous polyester (a2) | | | | |
| | Type | a1w (% by weight) | a2w (% by weight) | Type | a2b1 (% by mole) | a2a1 (% by mole) | a2a2 (% by mole) | a2a (% by mole) |
| Example 1 | PET | 95 | 0 | — | — | — | — | — |
| Example 2 | PET | 95 | 0 | — | — | — | — | — |
| Example 3 | PET | 95 | 0 | — | — | — | — | — |
| Example 4 | PET | 95 | 0 | — | — | — | — | — |
| Example 5 | PET | 90 | 0 | — | — | — | — | — |
| Example 6 | PET | 80 | 0 | — | — | — | — | — |
| Example 7 | PET | 75 | 0 | — | — | — | — | — |
| Example 8 | PET | 70 | 0 | — | — | — | — | — |
| Example 9 | PET | 65 | 10 | CHDM copolymerized PET | 33 | 0 | 0 | 0 |
| Example 10 | PET | 45 | 30 | CHDM copolymerized PET | 33 | 0 | 0 | 0 |
| Example 11 | PET | 39 | 30 | CHDM copolymerized PET | 33 | 0 | 0 | 0 |
| Example 12 | PET | 39 | 30 | CHDM copolymerized PET | 33 | 0 | 0 | 0 |
| Example 13 | PET | 39 | 30 | CHDM copolymerized PET | 33 | 0 | 0 | 0 |

TABLE 2-continued

| | Polyester resin component (A) | | | | | | | |
|---|---|---|---|---|---|---|---|---|
| | Crystalline polyester (a1) | | Amorphous polyester (a2) | | | | | |
| | Type | a1w (% by weight) | a2w (% by weight) | Type | a2b1 (% by mole) | a2a1 (% by mole) | a2a2 (% by mole) | a2a (% by mole) |
| Example 14 | PET | 34 | 30 | CHDM copolymerized PET | 33 | 0 | 0 | 0 |
| Example 15 | PET | 69 | 0 | — | — | — | — | — |
| Example 16 | PET | 69 | 0 | — | — | — | — | — |
| Example 17 | PET | 44 | 0 | — | — | — | — | — |
| Example 18 | PET | 34 | 10 | CHDM copolymerized PET | 33 | 0 | 0 | 0 |
| Example 19 | PET | 80 | 0 | — | — | — | — | — |
| Example 20 | PET | 95 | 0 | — | — | — | — | — |
| Example 21 | PET | 54.5 | 20.5 | CHDM copolymerized PET | 33 | 0 | 0 | 0 |
| Example 22 | PET | 53.5 | 21.5 | CHDM copolymerized PET | 33 | 0 | 0 | 0 |
| Example 23 | PET | 51.5 | 23.5 | CHDM copolymerized PET | 31 | 0 | 0 | 0 |
| Example 24 | PET | 51 | 24 | CHDM copolymerized PET | 33 | 0 | 0 | 0 |
| Example 25 | PET | 30 | 45 | CHDM copolymerized PET | 33 | 0 | 0 | 0 |

TABLE 3

| | Polyester resin component (A) | | | | | | | |
|---|---|---|---|---|---|---|---|---|
| | Crystalline polyester (a1) | | Amorphous polyester (a2) | | | | | |
| | Type | a1w (% by weight) | a2w (% by weight) | Type | a2b1 (% by mole) | a2a1 (% by mole) | a2a2 (% by mole) | a2a (% by mole) |
| Example 26 | PET | 45 | 30 | CHDM copolymerized PET | — | 33 | 0 | 33 |
| Example 27 | PET | 40 | 35 | Isophthalic acid copolymerized PET | — | 0 | 23 | 23 |
| Example 28 | PET | 48.5 | 20.5 | CHDM copolymerized PET | 28 | — | — | — |
| Example 29 | PET | 47.5 | 21.5 | CHDM copolymerized PET | 30 | — | — | — |
| Example 30 | PET | 45.5 | 23.5 | CHDM copolymerized PET | 28 | — | — | — |
| Example 31 | PET | 45 | 24 | CHDM copolymerized PET | 30 | — | — | — |
| Example 32 | PET | 24 | 45 | CHDM copolymerized PET | 33 | — | — | — |
| Example 33 | PET | 39 | 30 | CHDM copolymerized PET | — | 33 | 0 | 33 |
| Example 34 | PET | 34 | 35 | Isophthalic acid copolymerized PET | — | 0 | 23 | 23 |
| Example 35 | PET | 48.5 | 20.5 | CHDM copolymerized PET | 28 | — | — | — |
| Example 36 | PET | 47.5 | 21.5 | CHDM copolymerized PET | 30 | — | — | — |
| Example 37 | PET | 45.5 | 23.5 | CHDM copolymerized PET | 28 | — | — | — |
| Example 38 | PET | 45 | 24 | CHDM copolymerized PET | 30 | — | — | — |
| Example 39 | PET | 24 | 45 | CHDM copolymerized PET | 33 | — | — | — |
| Example 40 | PET | 39 | 30 | CHDM copolymerized PET | — | 33 | 0 | 33 |
| Example 41 | PET | 34 | 35 | Isophthalic acid copolymerized PET | — | 0 | 23 | 23 |
| Comparative Example 1 | PET | 95 | 0 | — | — | — | — | — |
| Comparative Example 2 | PET | 98 | 0 | — | — | — | — | — |
| Comparative Example 3 | PET | 95 | 0 | — | — | — | — | — |
| Comparative Example 4 | PET | 80 | 0 | — | — | — | — | — |
| Comparative Example 5 | PET | 80 | 0 | — | — | — | — | — |
| Comparative Example 6 | PET | 80 | 0 | — | — | — | — | — |

TABLE 3-continued

| | Polyester resin component (A) | | | | | | | |
|---|---|---|---|---|---|---|---|---|
| | Crystalline polyester (a1) | | Amorphous polyester (a2) | | | | | |
| | Type | a1w (% by weight) | a2w (% by weight) | Type | a2b1 (% by mole) | a2a1 (% by mole) | a2a2 (% by mole) | a2a (% by mole) |
| Comparative Example 7 | PET | 24 | 10 | CHDM copolymerized PET | 33 | — | — | — |

TABLE 4

| | X (% by mole) | y1 (% by mole) | y2 (% by mole) | Y (% by mole) | Incompatible component (B) Type | Tg (° C.) | Z (% by weight) | a2w/Z | (X + Y)/Z |
|---|---|---|---|---|---|---|---|---|---|
| Example 1 | 0 | 0 | 0 | 0 | TOPAS6013 | 140 | 5 | 0 | 0 |
| Example 2 | 0 | 0 | 0 | 0 | TOPAS6015 | 160 | 5 | 0 | 0 |
| Example 3 | 0 | 0 | 0 | 0 | TOPAS6017 | 180 | 5 | 0 | 0 |
| Example 4 | 0 | 0 | 0 | 0 | TOPAS6018 | 190 | 5 | 0 | 0 |
| Example 5 | 0 | 0 | 0 | 0 | TOPAS6017 | 180 | 10 | 0 | 0 |
| Example 6 | 0 | 0 | 0 | 0 | TOPAS6017 | 180 | 20 | 0 | 0 |
| Example 7 | 0 | 0 | 0 | 0 | TOPAS6017 | 180 | 25 | 0 | 0 |
| Example 8 | 0 | 0 | 0 | 0 | TOPAS6017 | 180 | 30 | 0 | 0 |
| Example 9 | 3.9 | 0 | 0 | 0 | TOPAS6017 | 180 | 25 | 0.40 | 0.157 |
| Example 10 | 12.2 | 0 | 0 | 0 | TOPAS6017 | 180 | 25 | 1.20 | 0.487 |
| Example 11 | 13.3 | 0 | 0 | 0 | TOPAS6017 | 180 | 25 | 1.20 | 0.532 |
| Example 12 | 13.3 | 0 | 0 | 0 | TOPAS6017 | 180 | 25 | 1.20 | 0.532 |
| Example 13 | 13.3 | 0 | 0 | 0 | TOPAS6017 | 180 | 25 | 1.20 | 0.532 |
| Example 14 | 14.4 | 0 | 0 | 0 | TOPAS6017 | 180 | 30 | 1.00 | 0.480 |
| Example 15 | 0 | 0 | 0 | 0 | TOPAS6017 | 180 | 25 | 0 | 0 |
| Example 16 | 0 | 0 | 0 | 0 | TOPAS6017 | 180 | 25 | 0 | 0 |
| Example 17 | 0 | 0 | 0 | 0 | TOPAS6017 | 180 | 50 | 0 | 0 |
| Example 18 | 6.8 | 0 | 0 | 0 | TOPAS6017 | 180 | 50 | 0.20 | 0.135 |
| Example 19 | 0 | 0 | 0 | 0 | TOPAS6013 | 140 | 20 | 0 | 0 |
| Example 20 | 0 | 0 | 0 | 0 | TOPAS6013 | 140 | 5 | 0 | 0 |
| Example 21 | 8.2 | 0 | 0 | 0 | TOPAS6017 | 180 | 25 | 0.82 | 0.327 |
| Example 22 | 8.6 | 0 | 0 | 0 | TOPAS6017 | 180 | 25 | 0.86 | 0.344 |
| Example 23 | 8.9 | 0 | 0 | 0 | TOPAS6017 | 180 | 25 | 0.94 | 0.356 |
| Example 24 | 9.6 | 0 | 0 | 0 | TOPAS6017 | 180 | 25 | 0.96 | 0.385 |
| Example 25 | 18.7 | 0 | 0 | 0 | TOPAS6017 | 180 | 25 | 1.80 | 0.750 |

TABLE 5

| | x (% by mole) | y1 (% by mole) | y2 (% by mole) | Y (% by mole) | Incompatible component (B) Type | Tg (° C.) | Z (% by weight) | a2w/Z | (X + Y)/Z |
|---|---|---|---|---|---|---|---|---|---|
| Example 26 | 0 | 13.1 | 0 | 13.1 | TOPAS6017 | 180 | 25 | 1.2 | 0.515 |
| Example 27 | 0 | 0 | 10.6 | 10.6 | TOPAS6017 | 180 | 25 | 1.4 | 0.423 |
| Example 28 | 7.7 | 0 | 0 | 0 | TOPAS6017 | 180 | 25 | 0.82 | 0.307 |
| Example 29 | 8.6 | 0 | 0 | 0 | TOPAS6017 | 180 | 25 | 0.86 | 0.344 |
| Example 30 | 8.8 | 0 | 0 | 0 | TOPAS6017 | 180 | 25 | 0.94 | 0.354 |
| Example 31 | 9.6 | 0 | 0 | 0 | TOPAS6017 | 180 | 25 | 0.96 | 0.385 |
| Example 32 | 20.5 | 0 | 0 | 0 | TOPAS6017 | 180 | 25 | 1.8 | 0.821 |
| Example 33 | 0 | 14.3 | 0 | 14.3 | TOPAS6017 | 180 | 25 | 1.2 | 0.561 |
| Example 34 | 0 | 0 | 11.7 | 11.7 | TOPAS6017 | 180 | 25 | 1.4 | 0.467 |
| Example 35 | 7.7 | 0 | 0 | 0 | TOPAS6017 | 180 | 25 | 0.82 | 0.307 |
| Example 36 | 8.6 | 0 | 0 | 0 | TOPAS6017 | 180 | 25 | 0.86 | 0.344 |
| Example 37 | 8.8 | 0 | 0 | 0 | TOPAS6017 | 180 | 25 | 0.94 | 0.354 |
| Example 38 | 9.6 | 0 | 0 | 0 | TOPAS6017 | 180 | 25 | 0.96 | 0.385 |
| Example 39 | 20.5 | 0 | 0 | 0 | TOPAS6017 | 180 | 25 | 1.80 | 0.821 |
| Example 40 | 0 | 14.3 | 0 | 14.3 | TOPAS6017 | 180 | 25 | 1.20 | 0.561 |
| Example 41 | 0 | 0 | 11.7 | 11.7 | TOPAS6017 | 180 | 25 | 1.4 | 0.467 |
| Comparative Example 1 | 0 | 0 | 0 | 0 | TOPAS6013 | 140 | 5 | 0 | 0 |
| Comparative Example 2 | 0 | 0 | 0 | 0 | TOPAS6013 | 140 | 2 | 0 | 0 |
| Comparative Example 3 | 0 | 0 | 0 | 0 | TOPAS8007 | 80 | 5 | 0 | 0 |
| Comparative Example 4 | 0 | 0 | 0 | 0 | TOPAS8007 | 80 | 20 | 0 | 0 |

TABLE 5-continued

|  | x (% by mole) | y1 (% by mole) | y2 (% by mole) | Y (% by mole) | Incompatible component (B) Type | Tg (° C.) | Incompatible component (B) (% by weight) | Z | a2w/Z | (X + Y)/Z |
|---|---|---|---|---|---|---|---|---|---|---|
| Comparative Example 5 | 0 | 0 | 0 | 0 | TOPAS8007 | 80 | 20 |  | 0 | 0 |
| Comparative Example 6 | 0 | 0 | 0 | 0 | PMP | 25 | 20 |  | 0 | 0 |
| Comparative Example 7 | 8.8 | 0 | 0 | 0 | TOPAS6017 | 180 | 60 |  | 0.17 | 0.147 |

TABLE 6

| | Dispersing agent C Dispersing agent (crystalline polyester-polyalkylene glycol copolymer (c1)) | | | | Dispersion size of incompatible component (B) in W layer | | | |
|---|---|---|---|---|---|---|---|---|
| | Type | Cw (% by weight) | C1w (% by weight) | a1w + c1w (% by weight) | Average dispersion size (μm) | Content of dispersions with sizes below 7 μm | Content of dispersions with sizes below 4 μm | Presence or absence of voids in W layer |
| Example 1 | — | 0 | 0 | 95 | 2.1 | 99% or more | Less than 99% | Present |
| Example 2 | — | 0 | 0 | 95 | 2.1 | 99% or more | Less than 99% | Present |
| Example 3 | — | 0 | 0 | 95 | 2.0 | 99% or more | Less than 99% | Present |
| Example 4 | — | 0 | 0 | 95 | 1.9 | 99% or more | Less than 99% | Present |
| Example 5 | — | 0 | 0 | 90 | 2.3 | 99% or more | Less than 99% | Present |
| Example 6 | — | 0 | 0 | 80 | 2.7 | 99% or more | Less than 99% | Present |
| Example 7 | — | 0 | 0 | 75 | 3.2 | 99% or more | Less than 99% | Present |
| Example 8 | — | 0 | 0 | 70 | 4.0 | 99% or more | Less than 99% | Present |
| Example 9 | — | 0 | 0 | 65 | 3.6 | 99% or more | Less than 99% | Present |
| Example 10 | — | 0 | 0 | 45 | 3.0 | 99% or more | Less than 99% | Present |
| Example 11 | PET-PEG copolymer | 6 | 6 | 45 | 2.2 | 99% or more | 99% or more | Present |
| Example 12 | PET-PAG copolymer | 6 | 6 | 45 | 1.6 | 99% or more | 99% or more | Present |
| Example 13 | PET-PAG copolymer | 6 | 6 | 45 | 1.6 | 99% or more | 99% or more | Present |
| Example 14 | PET-PAG copolymer | 6 | 6 | 40 | 1.9 | 99% or more | 99% or more | Present |
| Example 15 | PET-PEG copolymer | 6 | 6 | 75 | 2.4 | 99% or more | Less than 99% | Present |
| Example 16 | PET-PAG copolymer | 6 | 6 | 75 | 2.0 | 99% or more | Less than 99% | Present |
| Example 17 | PET-PAG copolymer | 6 | 6 | 50 | 2.6 | 99% or more | Less than 99% | Present |
| Example 18 | PET-PAG copolymer | 6 | 6 | 40 | 2.5 | 99% or more | 99% or more | Present |
| Example 19 | — | 0 | 0 | 80 | 2.1 | 99% or more | Less than 99% | Present |
| Example 20 | — | 0 | 0 | 95 | 1.6 | 99% or more | Less than 99% | Present |
| Example 21 | — | 0 | 0 | 54.5 | 3.2 | 99% or more | Less than 99% | Present |
| Example 22 | — | 0 | 0 | 53.5 | 3.2 | 99% or more | Less than 99% | Present |
| Example 23 | — | 0 | 0 | 51.5 | 3.2 | 99% or more | Less than 99% | Present |
| Example 24 | — | 0 | 0 | 51 | 3.0 | 99% or more | Less than 99% | Present |
| Example 25 | — | 0 | 0 | 30 | 2.9 | 99% or more | Less than 99% | Present |

TABLE 7

| | Dispersing agent C Dispersing agent (crystalline polyester-polyalkylene glycol copolymer (c1)) | | | | Dispersion size of incompatible component (B) in W layer | | | |
|---|---|---|---|---|---|---|---|---|
| | Type | Cw (% by weight) | c1w (% by weight) | a1w + c1w (% by weight) | Average dispersion size (μm) | Content of dispersions with sizes below 7 μm | Content of dispersions with sizes below 4 μm | Presence or absence of voids in W layer |
| Example 26 | — | 0 | 0 | 45 | 3 | 99% or more | Less than 99% | Present |
| Example 27 | — | 0 | 0 | 40 | 3.1 | 99% or more | Less than 99% | Present |
| Example 28 | PET-PAG copolymer | 6 | 6 | 54.5 | 2.0 | 99% or more | 99% or more | Present |

TABLE 7-continued

| | | Dispersing agent C Dispersing agent (crystalline polyester-polyalkylene glycol copolymer (c1)) | | | Dispersion size of incompatible component (B) in W layer | | | |
|---|---|---|---|---|---|---|---|---|
| | Type | Cw (% by weight) | c1w (% by weight) | a1w + c1w (% by weight) | Average dispersion size (μm) | Content of dispersions with sizes below 7 μm | Content of dispersions with sizes below 4 μm | Presence or absence of voids in W layer |
| Example 29 | PET-PAG copolymer | 6 | 6 | 53.5 | 2.0 | 99% or more | 99% or more | Present |
| Example 30 | PET-PAG copolymer | 6 | 6 | 51.5 | 2.0 | 99% or more | 99% or more | Present |
| Example 31 | PET-PAG copolymer | 6 | 6 | 51 | 1.7 | 99% or more | 99% or more | Present |
| Example 32 | PET-PAG copolymer | 6 | 6 | 30 | 1.5 | 99% or more | 99% or more | Present |
| Example 33 | PET-PAG copolymer | 6 | 6 | 45 | 1.6 | 99% or more | 99% or more | Present |
| Example 34 | PET-PAG copolymer | 6 | 6 | 40 | 1.7 | 99% or more | 99% or more | Present |
| Example 35 | PET-PAG copolymer | 6 | 6 | 54.5 | 2.0 | 99% or more | 99% or more | Present |
| Example 36 | PET-PAG copolymer | 6 | 6 | 53.5 | 2.0 | 99% or more | 99% or more | Present |
| Example 37 | PET-PAG copolymer | 6 | 6 | 51.5 | 2.0 | 99% or more | 99% or more | Present |
| Example 38 | PET-PAG copolymer | 6 | 6 | 51 | 1.7 | 99% or more | 99% or more | Present |
| Example 39 | PET-PAG copolymer | 6 | 6 | 30 | 1.5 | 99% or more | 99% or more | Present |
| Example 40 | PET-PAG copolymer | 6 | 6 | 45 | 1.6 | 99% or more | 99% or more | Present |
| Example 41 | PET-PAG copolymer | 6 | 6 | 40 | 1.7 | 99% or more | 99% or more | Present |
| Comparative Example 1 | — | 0 | 0 | 95 | 2.2 | 99% or more | Less than 99% | Absent |
| Comparative Example 2 | — | 0 | 0 | 98 | 1.6 | 99% or more | Less than 99% | Present |
| Comparative Example 3 | — | 0 | 0 | 95 | 2.8 | 99% or more | Less than 99% | Present |
| Comparative Example 4 | — | 0 | 0 | 80 | 5.1 | Less than 99% | Less than 99% | Present |
| Comparative Example 5 | — | 0 | 0 | 80 | 5.2 | Less than 99% | Less than 99% | Present |
| Comparative Example 6 | — | 0 | 0 | 80 | 7.3 | Less than 99% | Less than 99% | Present |
| Comparative Example 7 | PET-PAG copolymer | 6 | 6 | 30 | — | — | 99% or more | — |

TABLE 8

| | Film structure | Heat treatment temperature (° C.) | Stretchability | Film productivity | Heat resistance | Reflectivity (%) | Transmittance (%) | Thickness (μm) | Brightness (cd/m²) |
|---|---|---|---|---|---|---|---|---|---|
| Example 1 | Monolayer | 190 | S | S | A | 91.5 | 10.6 | 100 | 4000 |
| Example 2 | Monolayer | 210 | S | S | S | 91.7 | 10.5 | 100 | 4010 |
| Example 3 | Monolayer | 210 | S | S | S | 92.4 | 9.8 | 100 | 4180 |
| Example 4 | Monolayer | 210 | S | S | S | 92.8 | 9.5 | 100 | 4200 |
| Example 5 | Monolayer | 210 | A | S | S | 95.1 | 7.3 | 100 | 4300 |
| Example 6 | Monolayer | 210 | A | A | S | 96.1 | 6.2 | 100 | 4450 |
| Example 7 | Monolayer | 210 | B | B | S | 96.7 | 5.5 | 100 | 4480 |
| Example 8 | Monolayer | 210 | B | B | S | 97.1 | 5.0 | 100 | 4550 |
| Example 9 | Monolayer | 210 | A | A | S | 96.9 | 5.3 | 100 | 4500 |
| Example 10 | Monolayer | 210 | S | A | S | 97.4 | 4.7 | 100 | 4590 |
| Example 11 | Monolayer | 210 | S | A | A | 98.3 | 3.8 | 100 | 4740 |
| Example 12 | Monolayer | 210 | S | A | A | 98.8 | 3.3 | 100 | 4830 |
| Example 13 | Three-layer laminate | 210 | S | S | A | 98.9 | 3.3 | 110 | 4840 |
| Example 14 | Three-layer laminate | 210 | S | S | A | 99.0 | 3.1 | 110 | 4850 |
| Example 15 | Monolayer | 210 | B | A | S | 98.1 | 4.1 | 100 | 4720 |
| Example 16 | Monolayer | 210 | B | A | S | 98.3 | 3.7 | 100 | 4740 |

TABLE 8-continued

| | Film structure | Heat treatment temperature (° C.) | Stretchability | Film productivity | Heat resistance | Reflectivity (%) | Transmittance (%) | Thickness (μm) | Brightness (cd/m²) |
|---|---|---|---|---|---|---|---|---|---|
| Example 17 | Three-layer laminate | 210 | B | B | S | 99.2 | 2.9 | 110 | 4870 |
| Example 18 | Three-layer laminate | 210 | A | A | S | 99.4 | 2.6 | 110 | 4890 |
| Example 19 | Monolayer | 235 | A | A | S | 90.1 | 11.8 | 55 | 3900 |
| Example 20 | Monolayer | 190 | S | S | A | 95.0 | 7.5 | 100 | 4290 |
| Example 21 | Monolayer | 210 | A | A | S | 96.9 | 5.3 | 100 | 4490 |
| Example 22 | Monolayer | 210 | A | A | A | 97.0 | 5.2 | 100 | 4500 |
| Example 23 | Monolayer | 210 | S | A | A | 96.9 | 5.2 | 100 | 4500 |
| Example 24 | Monolayer | 210 | S | S | A | 97.4 | 4.7 | 100 | 4590 |
| Example 25 | Monolayer | 210 | S | S | B | 97.5 | 4.6 | 100 | 4600 |

TABLE 9

| | Film structure | Heat treatment temperature (° C.) | Stretchability | Film productivity | Heat resistance | Reflectivity (%) | Transmittance (%) | Thickness (μm) | Brightness (cd/m²) |
|---|---|---|---|---|---|---|---|---|---|
| Example 26 | Monolayer | 210 | S | A | A | 97.4 | 4.7 | 100 | 4590 |
| Example 27 | Monolayer | 210 | S | A | A | 97.3 | 4.8 | 100 | 4580 |
| Example 28 | Monolayer | 210 | A | A | S | 98.3 | 3.7 | 100 | 4740 |
| Example 29 | Monolayer | 210 | A | A | A | 98.3 | 3.7 | 100 | 4740 |
| Example 30 | Monolayer | 210 | S | A | A | 98.3 | 3.7 | 100 | 4740 |
| Example 31 | Monolayer | 210 | S | S | A | 98.9 | 3.2 | 100 | 4830 |
| Example 32 | Monolayer | 210 | S | S | B | 99.0 | 3.1 | 100 | 4850 |
| Example 33 | Monolayer | 210 | S | A | A | 98.8 | 3.3 | 100 | 4830 |
| Example 34 | Monolayer | 210 | S | A | A | 98.7 | 3.4 | 100 | 4820 |
| Example 35 | Three-layer laminate | 210 | A | A | S | 98.4 | 3.6 | 100 | 4750 |
| Example 36 | Three-layer laminate | 210 | A | S | A | 98.4 | 3.6 | 100 | 4750 |
| Example 37 | Three-layer laminate | 210 | S | S | A | 98.4 | 3.6 | 100 | 4750 |
| Example 38 | Three-layer laminate | 210 | S | S | A | 98.8 | 3.1 | 100 | 4830 |
| Example 39 | Three-layer laminate | 210 | S | S | B | 99.1 | 3.0 | 100 | 4860 |
| Example 40 | Three-layer laminate | 210 | S | A | A | 98.9 | 3.2 | 100 | 4840 |
| Example 41 | Three-layer laminate | 210 | S | A | A | 98.8 | 3.3 | 100 | 4830 |
| Comparative Example 1 | Monolayer | Without heat treatment | Unstretched | A | C | 41.0 | 63.4 | 100 | 2000 |
| Comparative Example 2 | Monolayer | 190 | S | A | A | 82.0 | 20.8 | 100 | 3470 |
| Comparative Example 3 | Monolayer | 190 | S | A | C | 88.3 | 14.5 | 100 | 3700 |
| Comparative Example 4 | Monolayer | 190 | B | A | C | 92.5 | 8.0 | 100 | 4190 |
| Comparative Example 5 | Monolayer | 235 | B | A | S | 83.3 | 17.3 | 55 | 3500 |
| Comparative Example 6 | Monolayer | 190 | A | B | B | 77.7 | 26.1 | 100 | 3200 |
| Comparative Example 7 | Three-layer laminate | — | C | C | — | — | — | — | — |

The abbreviations in the tables mean as follows:

a1w: the content (% by weight) of the crystalline polyester resin (a1) in the W layer a2w: the content (% by weight) of the amorphous polyester resin (a2) in the W layer a2b1: the content (% by mole) of the aliphatic cyclic diol component in the amorphous polyester resin (a2) based on the amount of the diol components constituting the amorphous polyester resin (a2)

a2a1: the content (% by mole) of the aliphatic cyclic dicarboxylic acid component in the amorphous polyester resin (a2) based on the amount of the dicarboxylic acid components constituting the amorphous polyester resin (a2)

a2a2: the content (% by mole) of the isophthalic acid component in the amorphous polyester resin (a2) based on the amount of the dicarboxylic acid components constituting the amorphous polyester resin (a2)

a2a: the sum (% by mole) of the contents (% by mole) of the aliphatic cyclic dicarboxylic acid component and the isophthalic acid component in the amorphous polyester resin (a2) based on the amount of the dicarboxylic acid components constituting the amorphous polyester resin (a2)

X: the content (% by mole) of the aliphatic cyclic diol component based on the amount of the diol components in the W layer y1: the content (% by mole) of the aliphatic cyclic dicarboxylic acid component based on the amount of the dicarboxylic acid components in the W layer y2: the content (% by mole) of the isophthalic acid component based on the amount of the dicarboxylic acid components in the W layer Y: the sum (% by mole) of the contents (% by mole) (y1 and y2) of the aliphatic cyclic dicarboxylic acid component and the isophthalic acid component based on the amount of the dicarboxylic acid components in the W layer Z: the content (% by weight) of the cyclic-olefin resin (b) in the W layer based on the amount of the whole of the W layer Cw: the content (% by weight) of the dispersing agent (C) based on the amount of the white polyester layer (W layer)

c1w: the content (% by weight) of the crystalline polyester-polyalkyleneglycol copolymer (c1) based on the amount of the white polyester layer (W layer)

INDUSTRIAL APPLICABILITY

The white film is suitable for use as not only a reflective sheet in backlight devices and lamp reflectors for image display but also any white film application such as a reflective sheet for lightning fixtures, a reflective sheet for lightning signboards, a backside reflective sheet for solar cells, or an image receiving paper sheet.

The invention claimed is:

1. A white polyester film comprising a white polyester layer (W layer) which includes a polyester resin component (A) and a component (B) incompatible with the resin component (A);

wherein the component (B) comprises a cyclic-olefin resin (b) having a glass transition temperature of 110° C. or more and a content Z in the range from 5 to 50% by weight based on the weight of the W layer;

wherein polyester resin component (A) comprises a crystalline polyester resin (a1) and an amorphous polyester resin (a2) produced by copolymerization;

wherein the crystalline polyester resin (a1) is present in an amount from 47.5 to 90% by weight based on the weight of the W layer;

wherein a weight ratio of the amorphous polyester resin (a2) to the cyclic olefin resin (b) is in the range selected from the group consisting of 0.01 to 0.85 and 0.95 to 1.75;

wherein the film is free of polybutylene terephthalate, having voids inside and a reflectivity of 96.1 to 99.1%.

2. The white polyester film according to claim 1, wherein the W layer contains an aliphatic cyclic diol component, or an aliphatic cyclic dicarboxylic acid component and/or an isophthalic acid component, and satisfies (1) or (2)

$$0.01 < (X+Y)/Z < 0.33 \quad (1)$$

$$0.37 < (X+Y)/Z < 0.75 \quad (2)$$

wherein X is a content (% by mole) of the aliphatic cyclic diol component based on the total amount of all diol components in the W layer, Y is a combined content (% by mole) of the aliphatic cyclic dicarboxylic acid component and the isophthalic acid component based on the total amount of all dicarboxylic acid components in the W layer.

3. The white polyester film according to claim 1, wherein the cyclic-olefin resin (b) is an amorphous cyclic-olefin resin.

4. The white polyester film according to claim 1, wherein the amorphous polyester resin (a2) is present in an amount of 10% by weight or more based on the weight of the W layer.

5. The white polyester film according to claim 1, wherein the W layer further contains a dispersing agent (C) in an amount of 0.1% by weight or more based on the weight of the W layer.

6. The white polyester film according to claim 5, wherein the dispersing agent (C) is a crystalline polyester-polyalkylene glycol copolymer (c1) including a polyester component and a polyalkylene glycol component.

7. The white polyester film according to claim 6, wherein the combined weight of the crystalline polyester resin (a1) and the crystalline polyester-polyalkyleneglycol copolymer (c1) is less than 50% by weight based on the weight of the W layer.

8. The white polyester film according to claim 1, wherein the cyclic-olefin rein (b) is present in the form of particles in the W layer and 99% or more of the particles have a particle size of 7 μm or less.

9. The white polyester film according to claim 1, further comprising another polyester layer placed on at least one side of the W layer.

10. The white polyester film according to claim 1, which is for use as a reflective film for a surface light source.

11. A surface light source comprising the white polyester film according to claim 1.

* * * * *